Jan. 4, 1927.
F. L. NAPIER
1,613,051
ROAD MACHINE
Filed Dec. 11, 1925        2 Sheets-Sheet 1
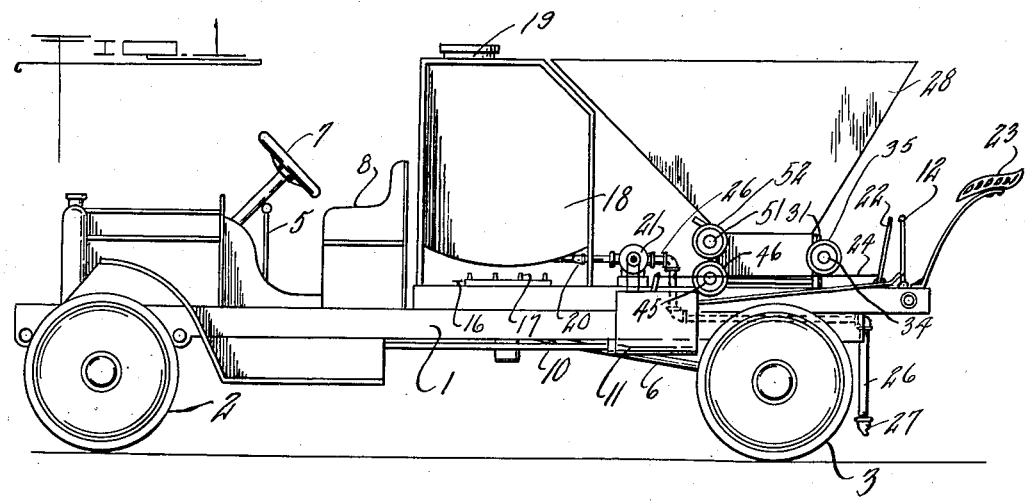
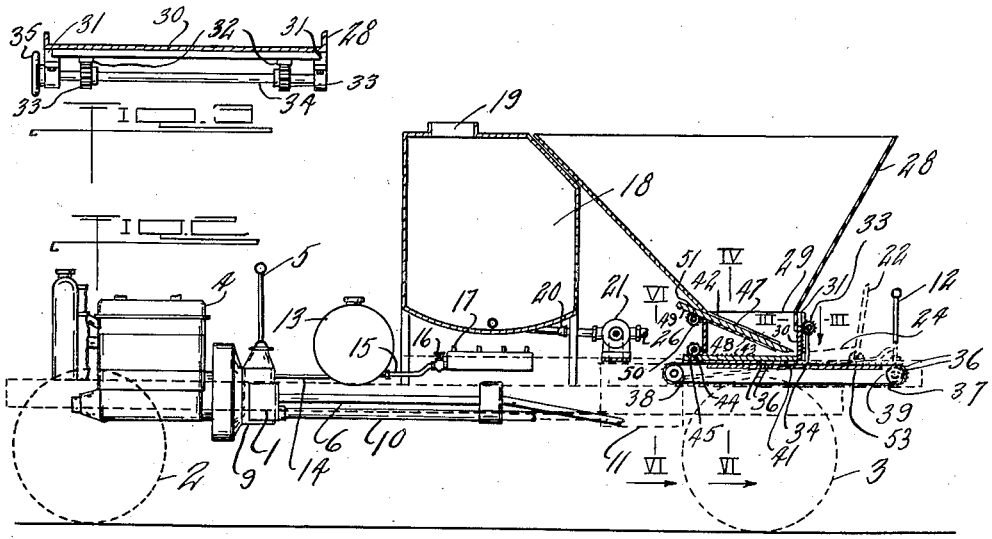
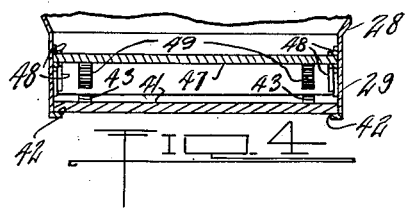
Frank L. Napier
INVENTOR
BY Geo E Kirk
ATTORNEY Jan. 4, 1927.
F. L. NAPIER
1,613,051
ROAD MACHINE
Filed Dec. 11, 1925     2 Sheets-Sheet 2
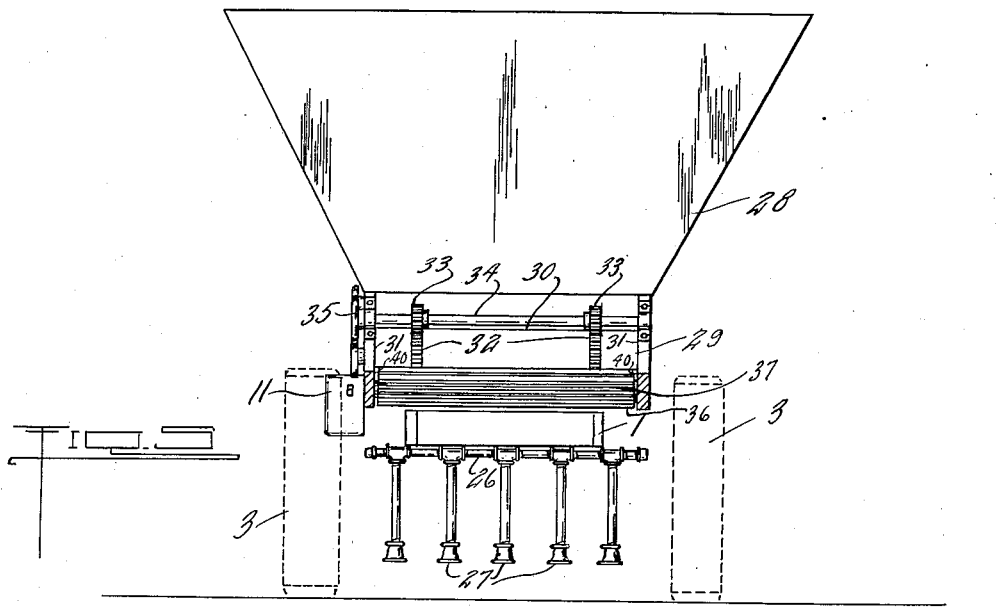
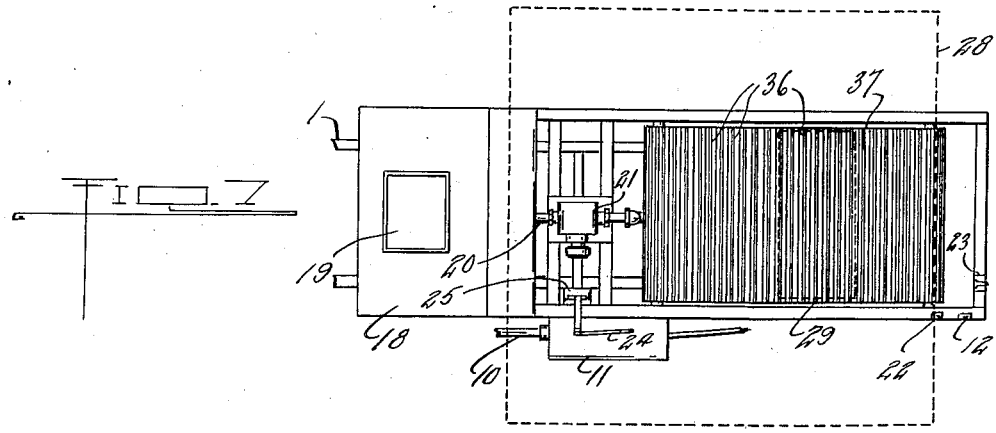
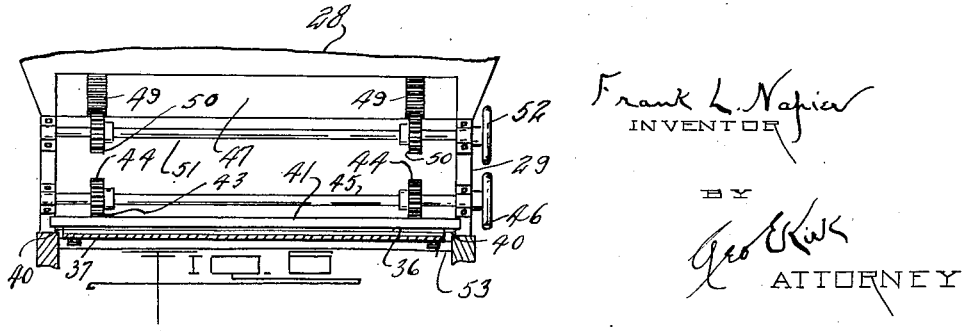

Patented Jan. 4, 1927.

1,613,051

UNITED STATES PATENT OFFICE.

FRANK L. NAPIER, OF ST. JOSEPH, OHIO.

ROAD MACHINE.

Application filed December 11, 1925. Serial No. 74,776.

This invention relates to distributing material.

This invention has utility when incorporated in road building and up-keep equipment for laying more or less dry material or materials to a determined thickness over a definite region.

Referring to the drawings:

Fig. 1 is a side elevation of an embodiment of the invention in a self-propelled vehicle;

Fig. 2 is a view of the truck of Fig. 1, with parts broken away or removed;

Fig. 3 is a section on the line III—III, Fig. 2, showing the skimmer gate;

Fig. 4 is a section on the line IV—IV, Fig. 2, showing the deflecting and load sustaining gates;

Fig. 5 is an end elevation of the discharge end, with parts broken away, of the truck of Fig. 1;

Fig. 6 is a partial view on the line VI—VI, Fig. 2, showing the load sustaining and deflector gate operating means; and Fig. 7 is a plan view of the truck of Fig. 1, parts being broken away.

Motor vehicle body 1 is shown as having forward steering wheels 2 and rear propulsion wheels 3. Motor 4 is operable to propel the vehicle as controlled by gear shift lever 5 for driving the rear wheels 3 through propeller shaft 6. The direction of travel of the vehicle is controlled by steering wheel 7 from operator's station 8.

From the motor 4, independently of the vehicle drive as controlled through the lever 5 and transmission 9, there is supplemental drive 10 extending to supplemental transmission 11 rearwardly of the vehicle as controllable by hand lever 12. The motor 4 is provided with fuel tank 13 therefor which tank besides having connection 14 for supplying the motor 4, has additional line 15 therefrom as controlled by valve 16 for burners 17, as heaters for oil in tank 18. This tank 18 may have the oil say as heavy road material or tar, charged thereinto through opening 19. From this tank 18 extends pipe 20 to pump 21. Hand lever 22 adjacent the operator's station 23, rearwardly of the vehicle adjacent the control handle 12, is effective through link 24 for connecting drive 25 from the transmission 11 for operating the pump 21 thereby forcing the hot oil from the tank 18 by way of pipe 26 to nozzles 27 for jetting oil in the provision of an anchoring bed directly following the vehicle.

Carried by this vehicle body 1 directly rearwardly of the tank 18 is hopper or load container 28 having full transverse width of the frame 1, bottom opening 29 which is herein shown as valved. The valves of this opening are herein shown as three independently adjustable gates. Gate 30 is vertically operable in ways 31 and is provided with racks 32 coacting with pinions 35 on shaft 34 as extending laterally from the frame 1 to carry hand wheel 35. Accordingly, by manipulating the hand wheel 35, this skimmer gate 30 may be raised or lowered. In lowering, this gate 30 descends toward and to just clear flights 36 on endless belt conveyor 37 having driving roller 38 for its top reach as cut in by transmission controlling lever 12. This endless belt conveyor 37 travels as to its upper reach lengthwise of the vehicle and rearwardly, and under-reach forwardly over the driving roller 38, thence rearwardly to idler roller 39. There is thus provided an upper reach of this belt 37 directly below the opening 29 from the hopper 28 and the full width of such opening 29, as determined by cheeks 40. To keep the load in the hopper 28 off the upper reach of this belt 37, there is provided gate 41 reciprocable in guides 42 toward and from the gate 30. This gate or load sustaining valve 41 is shiftable relatively to the upper reach of the belt or conveyor 37 at a constant clearance therefrom, and is provided with racks 43 coacting with pinions 44 on shaft 45 as extending laterally of the vehicle to have hand wheel 46, similar to hand wheel 35, operable for manually adjusting this gate 41.

Additionally, beside this skimmer gate 30 and this load sustaining gate 41, there is deflector gate 47 operable in guides 48 toward and from the skimmer gate 30. This deflector gate 48 is provided with racks 49 in mesh with pinions 50 on shaft 51 as protruding laterally of the vehicle to have manually operable wheel 52 on the same side of the vehicle as the wheels 35, 46, for the companion gates. Gate 47 always shields racks 49 from material.

The conveyor belt 37 may, in practice, have a maintained lineal speed at that of the vehicle for giving the determined layer discharge as that as adjusted to the belt. A speed in excess of the vehicle for this conveyor belt would mean a conveyor spread in excess of the measurement although such may be maintained uniform. However, if the travel of the belt 37 be reduced below that of the travel rate of the vehicle, then the delivered spread is less than that adjusted by the valves. Adjustment of the valve or gate 30 is a determined clearance for say one, two, three, four or other number of inches of layer or fraction desired to apply to the road bed, say of crushed stone or even a concrete mix, or a more or less plastic asphalt. This material of considerable weight has such load get clear of acting as a drag beyond this delivery as affecting the conveyor 37. However, this conveyor 37 is maintained as to its upper reach in a horizontal position by sustaining plate 53. In the operation it is desirable to have the material from the hopper 28 pass through opening 29 directly downward upon the belt. To this end, the gate 47 may be backed away from the skimmer gate 30 sufficiently for the material to readily flow down upon the belt 37, while the descent or the flow of a layer of said material to the belt 37 is restricted by an approximately similar degree of opening for the gate 41. The adjustable width slot for the effective outlet from the opening 29 may thus be nicely controlled as to clearance rearwardly from the skimmer gate 30 for coacting with a minimum of load resistance upon the belt 37 as to the depth of material as controlled by the gate 30.

The delivery of the material is thus a delivery which the operator at station 23 may definitely watch and control at all times for adjustment or maintenance. Furthermore, this material may be anchored or bedded in hot tar even as a thin layer of screenings applied to the tar as uniformly spread directly as such tar or oil strikes the road bed. There is, accordingly, a maximum of anchoring utility in such hot oil or tar, which may be further utilized by following this truck spreader with a roller. The spread is uniform and is without the intervention of manual handling of the materials determined for a swath as desired.

What is claimed and it is desired to secure by United States Letters Patent is:

1. A vehicle, an endless belt conveyor, means for causing the conveyor and belt to have a reach thereof travel lengthwise of the vehicle for discharging material from said reach, and a transversely uniform material delivering device to said reach comprising a material sustaining gate, a skimmer gate, and a deflector gate, each independently adjustable.

2. A vehicle, a hopper thereon having an opening at its lower portion extending transversely of the vehicle, a conveyor at said opening exterior of the hopper and as a material supporting closure for the hopper, means for operating said conveyor for shifting from the hopper and lengthwise of the vehicle the material in the hopper as supported by the conveyor, a gate at the hopper opening between the hopper and conveyor for cutting off communication between said hopper and conveyor and thereby restricting the extent of the hopper closure action of the conveyor, and adjusting means for said gate.

3. A vehicle, a hopper thereon having an opening at its lower portion extending transversely of the vehicle, an endless belt conveyor at said opening exterior of the hopper and as a material supporting closure for the hopper, said belt having flights, means for operating said conveyor for shifting from the hopper by said flights and lengthwise of the vehicle the material in the hopper as supported by the conveyor, a gate at the hopper opening between the hopper and conveyor for cutting off communication between said hopper and conveyor and thereby restricting the extent of the hopper closure action of the conveyor, and adjusting means for shifting the gate in travel clear of the flights to different degrees of gate opening.

4. A vehicle, an endless belt conveyor, means for causing the conveyor belt to have a reach thereof travel lengthwise of the vehicle for discharging material from said reach, and a transversely uniform material delivering device to said reach comprising an adjustable material sustaining gate for holding the material load off the reach which gate to the extent it is positioned in opening adjustment leaves the device to be closed against material flow therefrom by said reach, and an adjustable skimmer gate for regulating the depth of material on the reach as traveling from the sustaining gate opening.

5. A vehicle, an endless belt conveyor, means for causing the conveyor belt to have a reach thereof travel lengthwise of the vehicle for discharging material from said reach, and a transversely uniform material delivering device to said reach comprising three relatively adjustable gate members, one gate member varying the load of the material on the device upon another gate member, the second gate member varying the load of the material in the device on the reach which reach as at rest complete closure of the device, and the third gate member varying the depth of the material on the reach as traveling from the device.

In witness whereof I affix my signature.

FRANK L. NAPIER.

CERTIFICATE OF CORRECTION.

Patent No. 1,613,051. granted January 4, 1927.

to FRANK L. NAPIER.

It is hereby certified that error appears in the above mentioned patent requiring correction as follows: In the grant and in the heading to the printed specification, the residence of patentee is erroneously given as St. Joseph, Ohio, whereas said residence should have been given as St. Joseph, Michigan; and that the said Letters Patent should be read with this correction therein that the same may conform to the record of the case in the Patent Office.

Signed and sealed this 22nd day of February, A. D. 1927.

Seal.

M. J. Moore,
Acting Commissioner of Patents.